United States Patent [19]

Troletti

[11] Patent Number: 4,742,403
[45] Date of Patent: May 3, 1988

[54] DIGITAL DATA SEPARATOR

[75] Inventor: Bonifacio Troletti, Boario Terme, Italy

[73] Assignee: Honeywell Information Systems Italia, Caluso, Italy

[21] Appl. No.: 911,022

[22] Filed: Sep. 23, 1986

[30] Foreign Application Priority Data

Oct. 10, 1985 [IT] Italy .............................. 22431 A/85

[51] Int. Cl.⁴ .............................................. G11B 5/09
[52] U.S. Cl. ...................................................... 360/45
[58] Field of Search ....................... 360/45, 51; 375/101

[56] References Cited

U.S. PATENT DOCUMENTS 4,672,482 6/1987 Troletti .................................. 360/45

Primary Examiner—Vincent P. Canney
Attorney, Agent, or Firm—Faith F. Driscoll; John S. Solakian

[57] ABSTRACT

A digital data separator for use with apparatus for recovering binary information recorded in FM or MFM on magnetic media comprises a measuring unit which in correspondence with a read pulse n, supplies information representative of the actual duration of interval N between pulse n and the previous read pulse n−1. A media speed error recovery unit corrects such duration relative to the nominal speed according to a code representative of the media speed error, a peak-shift recovery unit which depending on the peak-shift of pulse n−1, determined on the basis of the temporal history of the most recent pulses n−3, n−2 and n−1 of such corrected duration, supplies duration information related to such interval and information representative of the direction and the entity of the peak-shift of the read out pulse n, and a speed error measuring unit defines a code representative of such error as the difference between the actual duration of a period consisting of a suitable number of subsequent intervals between read pulses and their nominal duration. This duration is corrected relative to the peak-shift of the pulses defining the beginning and the end of the period and is further "normalized" according to the nominal duration of the period. The speed error code is applied to the speed error recovery unit. The nominal duration of interval N is applied to a logic unit which generates a "window" signal and reconstructs the read pulse in a suitable phase relationship with the window signal.

3 Claims, 5 Drawing Sheets

DIGITAL DATA SEPARATOR

RELATED PATENT APPLICATIONS

1. The patent application of Bonifacio Troletti entitled, "Digital Data Separator", filed on Sept. 23, 1986, bearing Ser. No. 06/910,706, which is assigned to the same assignee as this patent application.

2. The patent application of Bonifacio Troletti entitled, "Digital Apparatus for Data Recovery System, which issued as U.S. Pat. No. 4,714,968 on Dec. 22, 1987 and which is assigned to the same assignee as this patent application.

3. The patent application of Bonifacio Troletti entitled, "Digital Apparatus for Magnetic Media Data Recovery System", which issued as U.S. Pat. No. 4,672,482 on June 9, 1987 and which is assigned to the same assignee as this patent application.

BACKGROUND OF THE INVENTION

1. Field of Use

The present invention relates to a digital data separator for apparatus used to recover binary information recorded on magnetic media, such as disks, diskettes, tapes, in frequency modulation (FM) or modified frequency modulation (MFM).

2. Prior Art

Successively read out binary 1 or 0 bits recorded in FM are identified by the presence or absence, respectively, of a pulse in the center of contiguous recorded cells. Each cell is defined by two timing pulses. The first pulse defines the beginning of the cell and the second pulse defines the beginning of the subsequent cell.

The time interval of a cell varies according to the media used. For instance, in the case of an 8-inch diskette and FM recording, the cell has a nominal length of 4 microseconds. Therefore, the nominal time intervals between two subsequent pulses may be 2 microseconds or 4 microseconds. In the case of a 5¼ inch diskette, the nominal length of a cell is generally 8 microseconds.

In the case of MFM recording, successively read out binary 1 or 0 bits are also identified by the presence or absence respectively of a pulse in the center of contiguous cells. However, MFM recording differs from FM recording in that the timing pulse, defining the beginning of a cell, is absent when a pulse representative of a binary 1 information is present in the center of such cell or in the preceding one.

Also, for MFM, the time interval of the cell depends on the recording media. For instance, in case of an 8-inch diskette and MFM recording, the nominal length of the cell is 2 microseconds. Therefore, the nominal interval time between two subsequent pulses can be 2, 3 or 4 microseconds. In the case of a 5¼ inch diskette, the nominal length of a cell is generally 4 microseconds. Further information on FM or MFM recording methods can be found in the IBM document GA 21-9257-1 entitled, "IBM Two side diskette Original Equipment Manufacturers Information—Second Edition", dated November, 1977.

The pulse sequence read out from the magnetic media support is applied to an input of a recovery system which supplies to an output, the binary information related to the input pulse sequence. Such pulse sequence periodically includes a so-called synchronization field (generally of 6 or 12 bytes), containing a predetermined number of pulses corresponding to a plurality of contiguous cells in which all "1" information bits or all "0" information bits have been recorded. The synchronization field is used by the recovery system for locking in and for establishing if a pulse detected in the input is a timing pulse or a pulse representative of a recorded information bit. The recovery system is therefore able to correctly detect information recorded on the magnetic medium on the basis of the time interval between two subsequent pulses and the nature of such pulses.

Unfortunately, data recovery only through measurement of the time interval between subsequent pulses is not reliable, since such interval may present a substantial deviation from its nominal value resulting in the misinterpretation of the pulse sequence during the recovery phase. Such deviation results from two main causes. The first is due to speed changes in the magnetic media, that is, in the rotational speed tolerances of the motor which drives the magnetic media. The second is due to the so-called phenomenon of peak-shift of the recorded pulse. As it is well known in the art, such shift is primarily due to the mutual influence of adjacent pulses. As known, such shift can be considered zero only when the recorded pulses density is constant, that is, the interval between subsequent pulses is always equal.

Clearly, this situation does not exist in FM and MFM recording, except for the synchronization field. Therefore, the recovery system needs apparatus to correct for the causes of such errors. The most well known of these apparatuses are those which make use of an analog phase lock oscillator. Digital phase lock circuits have been recently suggested.

Among the phase lock circuits, the apparatus disclosed in European patent application No. 84107390.1 of June 22, 1984, published on May 15, 1985 with number 0141028 can be considered as exemplary of the state of the art. This patent application corresponds to U.S. patent application entitled, "Digital Apparatus for Magnetic Data Recovery System", Ser. No. 06/659,112, filed on Oct. 9, 1984. According to such patent application, the problem of recovering digital information recorded on magnetic media is solved by providing circuits able to identify, through the measurement of the actual interval between subsequent pulses, the synchronization field which is not affected by peak-shift but only by a possible speed error, and therefore is able to establish the speed error of the magnetic media as to nominal speed during a time interval which comprises a suitable number of read out pulses. This information, updated at each synchronization field detection, is used during the reading out of subsequent read out pulses to correct the interval measured between subsequent read out pulses, thus providing a measured interval only affected by peak-shift error of pulse n and n−1 defining the measured interval.

This information is applied to a peak-shift recovery unit together with coded information feedback by the same recovery unit, defining, in suitable code, the entity and the direction of the peak-shift of read pulse n−1. The deduction of the peak-shift of read pulse n−1 from the correct duration measure allows the calculation of the nominal duration of the interval N between read pulse n−1, n and the entity and the direction of the peak-shift of pulse n. The peak-shift of pulse n is fed back to discriminate between the nominal duration of the subsequent interval N+1 and the peak-shift of the subsequent read pulse n+1 and so on.

To avoid the propagation and the accumulation of measurement errors, the peak-shift recovery system feeds back not the peak-shift measurement obtained by a difference between measures, but an "equivalent" code representative of the nominal and actual durations of a determined number of intervals between immediately preceding read pulses. The approach disclosed by the mentioned patent application is extremely efficacious and provides a high discriminating capability, greater than the one offered by a number of analog circuits and by other digital circuits. Subsequently, it follows a correction concept in two phases, a speed correction based on a precise speed measurement, speed being detected when peak-shifted phenomena are missing, and a subsequent peak-shift recovery.

However, this approach is inherently affected by a limitation. That is, it cannot be used when the media speed variation occurs with a frequency equal or higher than the speed measurement frequency. It has been further verified that in the case of low cost disks or tape units, particularly "disk drivers" for flexible diskettes with 5¼ inch diameter, speed swingings can occur with frequency of about 1KHz and amplitude of ±5÷8% from the nominal speed. When speed swinging of this frequency occurs, the operation of the discriminating apparatus disclosed by the mentioned application is seriously jeopardized.

It would be desirable to have a discriminating apparatus not only able to substantially offer the same performance provided by the apparatus disclosed in the mentioned application but also one which operates with magnetic media subject to swinging up to 1 KHz. This is required to enable the generalized use of low cost actuating units.

The mentioned patent application has a further drawback in that the speed error correction is made by means of a read only memory. This memory is addressed by a code representative of the measured duration of the time interval elapsing between two read out pulses and by a code which is representative of the speed error. Therefore, it acts as a transcoder by supplying as an output, a code representative of the correct duration of a time interval with respect to the speed error.

In practice, for the purpose of attaining an adequate resolution, the use of a memory having at least a 2 K addressable byte capacity is required. Furthermore, this memory would be used to recognize the synchronization fields by identifying those intervals whose difference in the actual measured duration is lesser than certain prefixed limits. These limits are different in case of MFM and FM recordings. To obtain an apparatus compatible with both types of recordings, a signal, hence a preselection input defining the type of recording used must be provided. Therefore, the required memory capacity increases up to 4K bytes.

As a result, the disclosed digital apparatus can only be embodied as an integrated circuit by using large-size and expensive chips. From this point of view, a discriminator apparatus is advisable where the speed error correction requires circuits which can be more easily integrated.

SUMMARY OF THE INVENTION

The above objectives are achieved by means of the digital data separator for an apparatus used to recover binary information recorded on magnetic media. This separator carries out a correction of the actual duration of the intervals according to a speed difference defined through the measurement of the actual duration of a succession of N subsequent intervals and the comparison with the sum of the nominal durations of said intervals. When measuring the actual duration of the succession of intervals, both the peak-shift of the beginning pulse of the first measured interval and the peak-shift of the ending pulse of the last measured interval are considered so that no measuring errors are caused. These operations are executed by a logical network which combines the use of adders and subtractors with read only memories, each having a capacity, whose total surface area is no greater than the equivalent of 0.5K bytes. These operations are continuously performed on any recorded field with a frequency no less than 15÷20 KHz, that is much higher than the frequency at which a speed change may occur.

As the detection of synchronization field is not required, the use of a signal for discriminating between the different types of recording becomes unnecessary and the memory capacity can be further reduced. Since the definition of the nominal duration is only possible after the speed correction of the measured duration, the speed error correction could be considered as tautologic because it involves the detection of nominal interval duration to be related to measured actual durations. On the contrary, the speed error correction can be actually carried out because in correspondence with the synchronization fields, which are not affected by peak-shift at least, it is possible to establish an unequivocal correspondence between nominal and measured interval durations also when important speed errors are present. In other words, the locking of the recovery apparatus to the detected pulse sequence can be made.

According to another aspect of the present invention, the speed error defined over a period, made up of several subsequent intervals and, therefore, the average value of a parameter which is continuously changing, is not directly used to execute a speed correction but is used to "extrapolate" as a function of a previously detected speed error, the speed error which comes closer to the foreseeable speed error conditions to be corrected. In this way, the apparatus response in dynamic conditions is prompt and precise. These and other features and advantages will appear more clearly from the following description of a preferred embodiment of the invention and from the drawings.

DESCRIPTION OF THE PREFERRED EMBODIMENT

Figure 1:
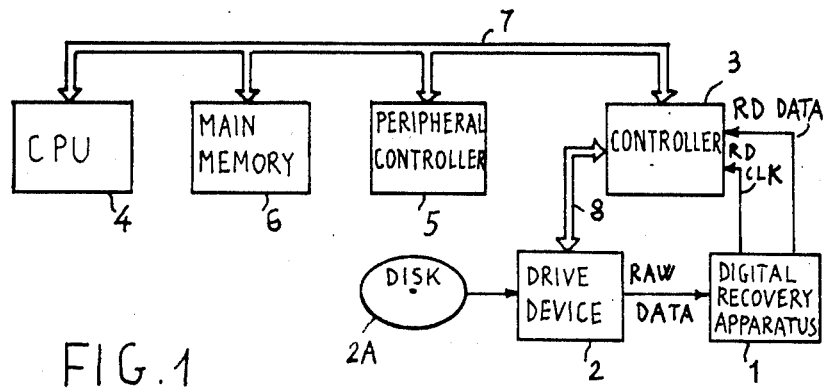
FIG. 1 shows in block diagram form, a data processing system including the digital separator of the present invention.

FIG. 1 shows in block diagram form, a typical data processing system which includes the digital apparatus of the present invention. Such apparatus, indicated by reference number 1, is positioned between a drive device 2 for a mass storage 2A and a controller 3. The system of FIG. 1 further comprises a central processor 4, a peripheral controller 5 and a main memory 6. Central processor 4, main memory 6 and controllers 3 and 5 are connected to each other by means of a plurality of leads or system bus 7 through which data, addresses and control signals can be exchanged.

In the present embodiment, it is assumed that the system mass storage is provided with a 5¼ inch diskette and that drive device 2 is a disk drive. The consideration given in the following will be, however, valid for other kinds of storage devices too, as for example, magnetic tape storage.

In the present embodiment, where a mass storage is provided by a diskette, a standard circuit chip, such as the 1791 integrated circuit chip, manufactured by Western Digital Corporation, can be used as controller 3. Controller 3 and drive device 2 exchange a plurality of control and information signals through a channel or bus 8. A detailed description of the circuits and interface signals between controller 3 and device 2 has been omitted since it is not essential for an understanding of the present invention.

In the case of the embodiment of the present invention, with a 5¼ inch diskette used for mass storage together with the 1791 integrated circuit chip manufactured by Western Digital as controller, the circuits and interface signals can be derived from the specification of such products. The same considerations apply to the interface between controller 3 and recovery apparatus 1.

It is pointed out that the recovery apparatus 1 must supply controller 3 with a square wave signal RD CLK and with a pulse train RD DATA at logical level 0, each pulse corresponding to a magnetic flux transition detected on recording media. Pulses RD DATA and window signal RD CLK have only to fulfill the condition that each pulse RD DATA occur entirely within a half wave (or window) of signal RD CLK. As for the rest, the pulse position relative to window signal RD CLK and the pulse length can be arbitrary. However, it is preferred that the length of the pulse RD DATA fall in the range of 100 to 250 nanoseconds and that the delay of the beginning or end of a pulse relative to the transition of window signal RD CLK should be no longer than 40 nanoseconds.

Controller 3 does not need to be informed of whether each one of the pulses RD DATA corresponds to a timing transition or to a data transition. The controller is able to distinguish between such transitions from the pattern read out in response to the well known synchronization and "address mark" fields. Also, the period of the timing or window signal can vary and each of the two signals half waves may have a different length.

Device 2 supplies digital apparatus 1 with a pulse RAW DATA in response to each detected magnetic flux transition. Since the disclosed system is intended to recover both FM and MFM recorded information, the time intervals between subsequent pulses RAW DATA are indicative of such information. Apparatus 1, in response to the pulse train RAW DATA received as an input, supplies controller 3 with the window signal RD CLK and with the pulses RD DATA which correspond to the pulses RAW DATA suitably positioned relative to window signal RD CLK. By means of signal RD CLK, controller 3 is able to detect the information bits within the pulse train RD DATA and make them available in parallel form to system bus 7.

Figure 2:
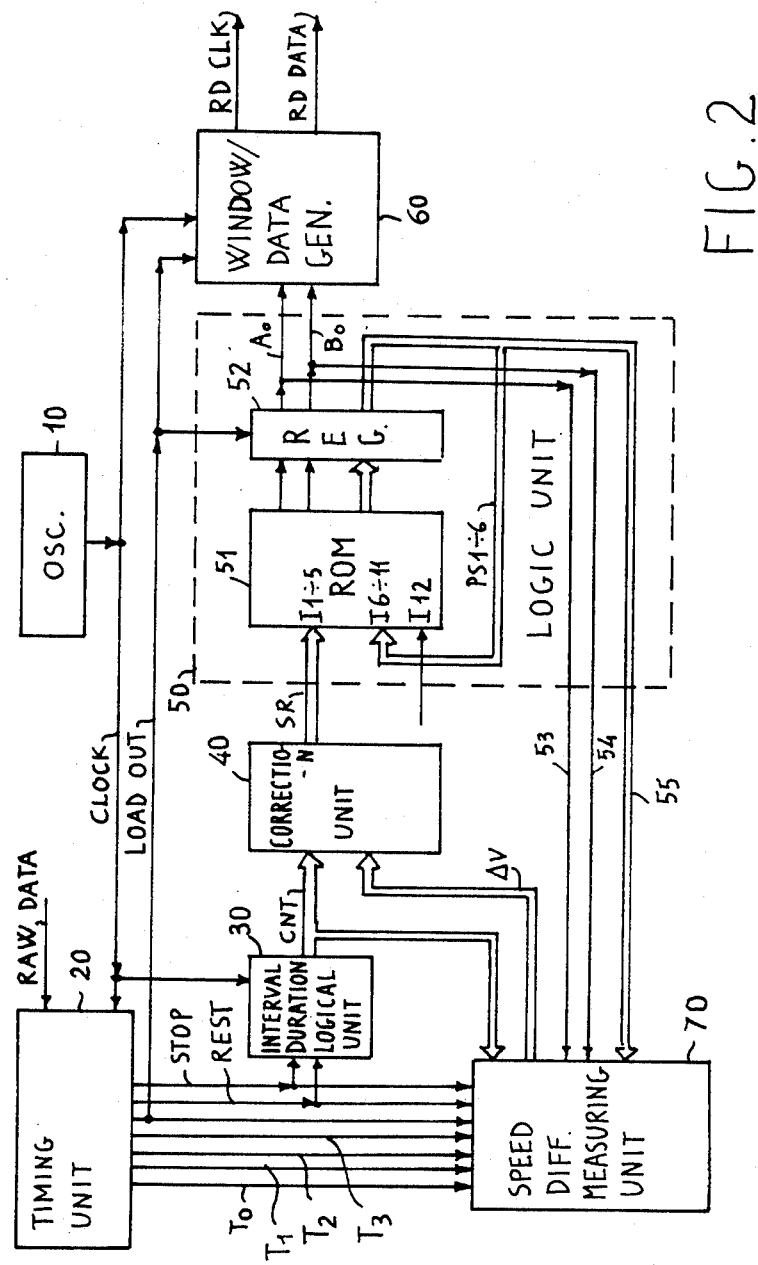
FIG. 2 shows in block diagram form, the digital separator of the present invention.

FIG. 2 shows in block diagram form, the digital apparatus 1 of FIG. 1 which corresponds to the apparatus of the present invention. Apparatus 1 essentially comprises an oscillator 10, a timing unit 20, a logical unit 30 for measuring the interval duration between subsequent input pulses, a logical unit 40 for correcting such duration according to a speed difference relative to a preestablished speed, a logic unit 50 for the peak-shift recovery and discrimination of the nominal duration corresponding to each interval, a logic unit 60 for reconstructing the read pulse train RD DATA within a window signal RD CLK generated by unit 60 itself and a unit 70 for measuring and determining the speed difference relative to a preestablished speed. Oscillator 10 supplies units 20, 30 and 60 with a square wave signal CLOCK having a frequency of 8 MHz.

Timing unit 20 is activated by each of the pulses RAW DATA and supplies a plurality of timing signals REST, STOP, T0, T1, T2, T3 and LOAD OUT, to units 30, 50, 60 and 70 in order to control and synchronize their operation. Particularly, all the mentioned signals are sent to unit 70 while only signal LOAD OUT is sent to units 50 and 60, and only signals REST and STOP are sent to unit 30. Timing unit 20 can be constructed in several ways, such as with shift registers, delay lines and particularly with the same components and connections shown in FIG. 3 of the already mentioned European patent application. Therefore, any further description is unnecessary.

For ease of understanding the invention, reference is made to FIG. 3 which shows in a timing diagram, the signals generated by oscillator 10 and by unit 20 together with other signals which will be later considered. The diagram labeled CLOCK is representative of signal CLOCK generated by oscillator 10. The diagram labeled RAW DATA is representative of the read pulses received from unit 20. The read pulses appear as asynchronous events relative to signal CLOCK and at variable time intervals due to the magnetic media speed error and peak-shift.

With the rise of signal CLOCK, immediately subsequent to the rise of signal RAW DATA, signal STOP rises to a "1" and is kept at a "1" for a duration of 19 CLOCK periods. When signal STOP falls to a "0" a signal REST, normally at a "1" falls to a "0" for a duration of one CLOCK period. Signals T0, LOAD OUT, T1, T2 and T3 rise to logical 1 level for the duration of two CLOCK periods, respectively, after 8, 16, 19, 20 and 25 CLOCK periods from the rise of signal STOP.

Figure 4:
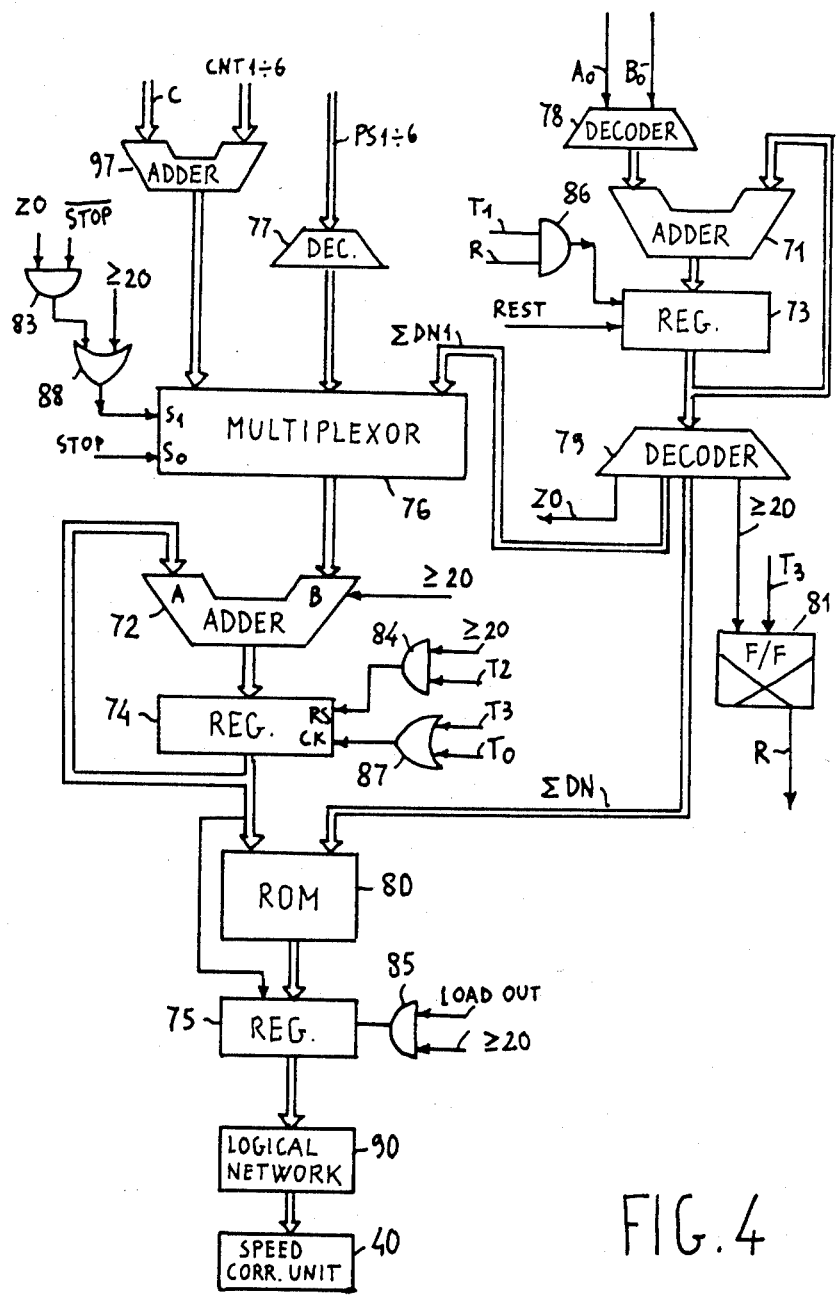
FIG. 4 shows in detail a preferred embodiment of a speed error measuring unit of the data separator.

The sequence is triggered by pulse RAW DATA and, when the sequence is exhausted, unit 20 remains inactive until a new trigger pulse is received. Measuring unit 30 includes a six cell binary counter, as for example, two 4-bit integrated counters, such as shown in FIG. 4 of the previously mentioned patent application. It is reset by signal REST when at logical 0 level and is incremented on each CLOCK pulse received on a clock input for the entire time signal STOP, applied to a control input, is at logical 0 level. Counter/unit 30 stops when signal STOP is at logical 1 level.

Counter/unit 30 supplies as an output on a channel CNT, a 6-bit binary code CNT÷6 representative of the interval between the rising of two read pulses RAW DATA, expressed in the number of CLOCK periods, less a fixed duration equal to 20 CLOCK periods (that is, 20·125=2500 nanosecods). The measurement is affected by an uncertainty due to the asynchronous rising of pulses RAW DATA relative to the CLOCK pulses. The maximum value of such uncertainty is equal to two CLOCK periods, that is, ±125 nanoseconds. Counter 30 is therefore able to measure, with a resolution of ±125 nanoseconds, time intervals varying from 2500 nanoseconds to $2500 + 125 \cdot (2^6 - 1) = 10.375$ nanoseconds.

The binary code CNT1 ÷ 6 remains unchanged for the entire time signal STOP is at logical 1 level and is applied as an input to both the speed difference recovery unit 40 and the speed error measurement unit 70. Unit 40 further receives through a 5 lead bus Δ V, a binary code 0 ÷ 4 representative of the speed error as to the media nominal speed. The memory 40 acts as transcoder and changes the code CNT1 ÷ 6 received on channel CNT to a 6-bit code SR 1 ÷ 6 representative of an interval duration between read pulses corrected according to code Δ0 ÷ 4, that is, without speed error. Code SR 1 ÷ 6 is applied through channel SR to peak-shift recovery unit 50.

As shown in FIG. 2, unit 50 includes a permanent memory 51, having for instance, a capacity of 4K bytes and an 8-bit latch register 52. Memory 51 is provided with 12 address inputs I1 ÷ 12. Five of them, I1 ÷ 5, receive code SR1 ÷ 6. Six inputs I6 ÷ 11 are connected to six of the eight outputs of register 52 and the remaining input I12 receives a selection signal defining the kind of recording FM/MFM. The outputs of memory 51 are connected to the inputs of register 52. The information output from memory 51 is loaded into register 52 when the register is enabled by the rising edge of periodic signal LOAD OUT.

As described in the previously mentioned European patent application, peak-shift recovery unit 50 operates as follows. Memory 51 is addressed by a code SR1 ÷ 6 representative of the measured actual duration $DE_N$, corrected as concerns a possible speed error of an interval N between two read pulses n−1 and n. It is further addressed by a 6-bit code fed back through register 52 representative in coded form of the entity and direction (positive or negative) of the peak-shift $PS_{n-1}$ of read pulse n−1. In other words, remember that the nominal duration $DN_N$ of interval N differs from duration $DE_N$ (corrected as concerns speed) due to peak-shifts $PS_{n-1}$ and $PS_n$ of read pulses n−1 and n which define interval N, that is:

$$DE_N = DN_N - PS_{n-1} + PS_n$$

wherein the quantity $D_N + PS_n$ is defined and the discrimination between the two components is made possible.

memory 51 contains transcoding codes which perform such discrimination and, for each addressable position, that is, for each pair of information $DE_N$ and $PS_{n-1}$, supplies as an output, the pair of information $DN_N$, $PS_N$, that is, a 2-bit binary code $A_0$, $B_0$, specifying whether the nominal duration is 4, 6 or 8 microseconds, and a six-bit binary code PS 1 ÷ 6 specifying in an indirect way, the entity and the direction of peak-shift PS n−1. The codes A0, B0 and PS 1 ÷ 6 are loaded into register 52 and from there respectively are sent to two inputs of unit 60 (code A0, B0) and to address inputs I6 ÷ 11 of memory 51 as well as to corresponding inputs of unit 70 through leads 53 and 54 and bus 55.

It will be noted that peak-shift recovery unit 50 is quite identical apart from connections 53, 54 and 55 to and operates in the same way as the corresponding peak-shift recovery unit described in the mentioned European patent application so that any further description is not required. It need only be pointed out that the transcoding codes recorded in memory 51 generate an output code PS1 ÷ 6 which is related to the peak-shift (code PS1 ÷ 6 is representative of the actual duration of an interval $DE_N$ and the nominal duration $DN_N$ and $DN_{N-1}$ of the same interval and of the previous one) as explained in the mentioned application. This is necessary, in the mentioned application, to avoid the propagation and the accumulation of measurement efforts.

Also, unit 50 can be modified in such a way as to reduce considerably, the memory capacity required for the peak-shift recovering. These modifications are the subject of a related patent application entitled, "Digital Data Separator", by Bonifacio Troletti, filed on even date with the present application. Logic unit 60 timed by signals CLOCK and LOAD OUT, supplies as an output according to code A0, B0, a timing window signal RD CLK and a data signal RD DATA, which can be detected by the controller 3 of FIG. 1. Since logic unit 60 is identical to the one disclosed by the mentioned application and its description is unessential for the understanding of this invention, reference may be made to the mentioned application for its architecture and operation details.

Figure 5:
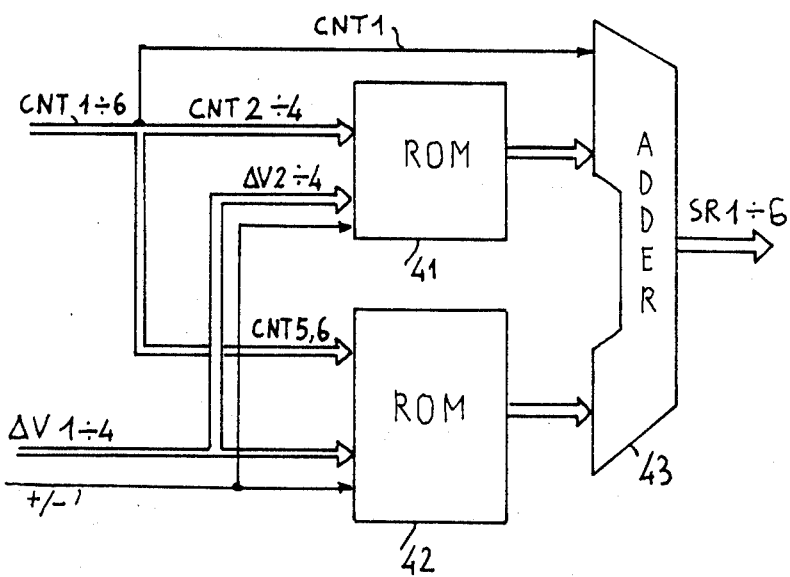
FIG. 5 shows in detail a preferred embodiment of a speed error correction unit of the data separator.

Speed error recovery unit 70 and speed error correction unit 40 of the present invention will now be considered with reference to FIGS. 4 and 5. Unit 70 comprises two adders 71 and 97, an algebraic adder 72, three latch registers 73, 74 and 75, a multiplexer 76, three decoders 77, 78 and 79, a read only memory 80, a D flip-flop 81, four two inputs AND gates 83, 84, 85 and 86 and two OR gates 87 and 88 with two inputs. Code A0, B0 is applied as an input to decoder 78 which changes it into a three-bit binary code DN representative of the nominal duration of an interval as multiples of 2 microseconds, that is, DN=010 corresponds to four microseconds, DN=011 corresponds to 6 microseconds and DN=100 corresponds to eight microseconds. Code DN is applied to a first set of inputs of adder 71.

The adder 71 outputs are connected to the inputs of register 73 which latches the result of the addition operation performed by adder 71. The register 73 outputs are connected to a second set of inputs of adder 71 and to inputs of decoder 79. Register 73 is periodically loaded on the rising edge of signal REST. Adder 71 and register 73 therefore operate as a total counter of nominal interval durations. Starting from a reset state, when the total counter reaches a count value equal to or high than 20, corresponding to 40 microseconds, decoder 79 generates a signal "≧20" which is applied to the input of flip-flop 81 and latched therein by pulse T3. Thensignal R rises as an output from flip-flop 81 and, suitably timed by signal T1 through AND gate 86, resets register 73. Decoder 79 supplies as an output, besides signal "≧20", signal "Z0" which is present when register 73 is reset, a multiple bit code ΣDN1 representative, with the same measuring unit through which CNT is represented, of the sum of the nominal duration of the counted intervals, and a two-bit code ΣDN representative of the total of the counted interval nominal duration, that is 40, 42, 44 or 46 microseconds. In fact, the total counter sums the duration of intervals whose duration can be of 4, 6 or 8 microseconds so that their sum could be higher than 40 microseconds.

Code DN1 is applied to the first iput of a three input multiplexer 76. A code CNT 1÷6 plus a constant C equivalent to 2500 nanoseconds are applied to a second input through adder 97 and a code PS1÷6 is applied to the third input through decoder 77. The function of decoder 77, for instance a 6 address ROM, is to change the code output from unit 50 into a code representative of the entity and the direction of a pulse peak-shift with the same unit measuring CNT and DN1.

By convention, the peak-shifts are considered as positive when the pulses are in advance of their nominal position and negative when the pulses are delayed. The multiplexer input selection is controlled by suitable signals applied to selection inputs S0 and S1. When S0=1 and S1=0, the second input is selected (code CNT 1÷6). When S0=1 and S1=1, the third input is selected (code PS1). When S0=1 and S1=1, the first input is selected (code DN1).

Selection input S0 receives signal STOP. Input S1 receives signal ≧20 through OR gate 88 as well as a signal as an output from AND gate 83 which, in turn, receives signals Z0 and STOP at its inputs. The output of multiplexer 76 is connected to input B of adder 72 whose output is connected to the input of register 74. The output of register 74 is connected to a second A input of adder 72. The addition-subtraction function is controlled by signal ≧20 applied to counter 72. When signal ≧20 is not present, adder 72 executes algebraic sums. When signal ≧20 is present, adder 72 algebraically subtracts from the binary code present on input A, the code present on input B. Register 74 acts as a total register and is loaded when the rising edge of signal T0 or T3 is applied to the clock input through OR gate 87. Register 74 is reset by timing pulse T2 through AND gate 84 when signal "≧20" is present.

DESCRIPTION OF OPERATION

Figure 3:
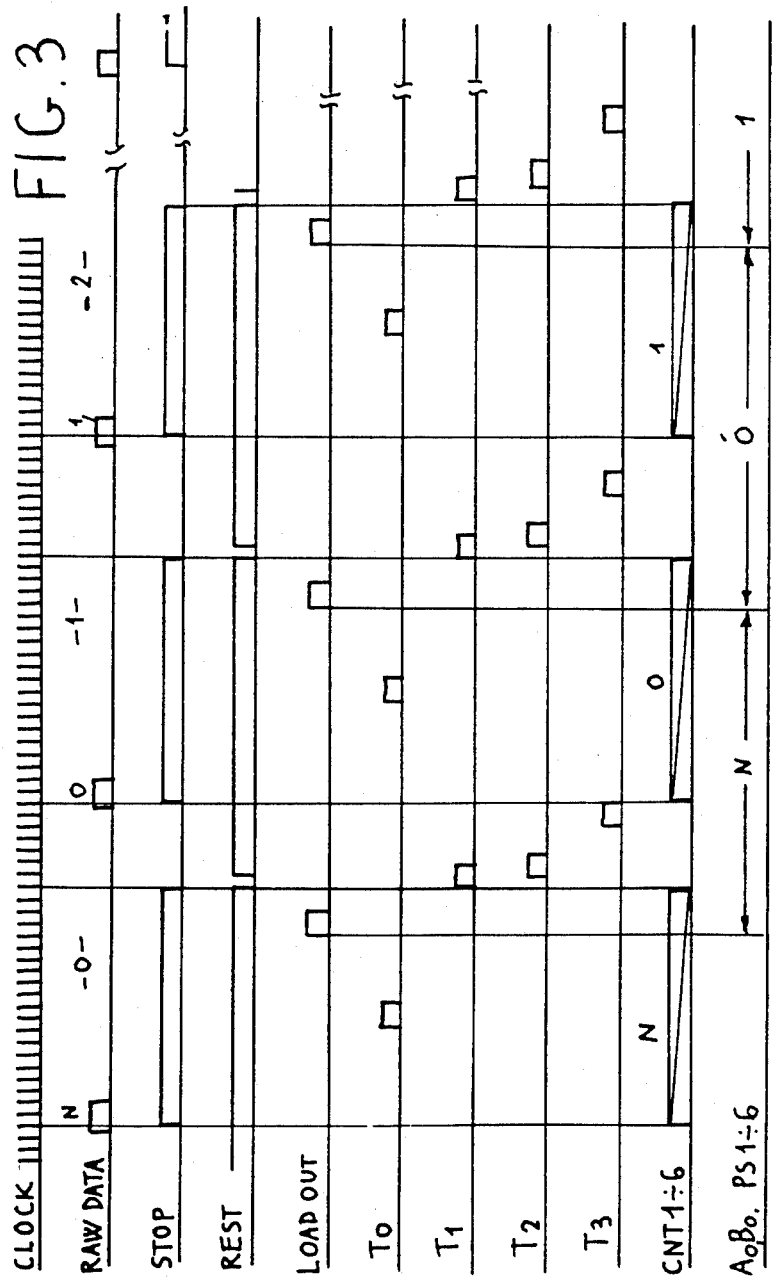
FIG. 3 shows a timing diagram of some signals of the digital separator shown in FIG. 2.

The operation of the disclosed circuit elements can be easily understood by reference to the timing diagrams shown in FIG. 3, where for ease of understanding, the pulses RAW DATA are numbered by N, 0 and 1, as well as the intervals between read pulses. In FIG. 3, it is shown that a code CNT 1÷6 relative to each interval (indicated by N, 0, 1, . . .) is valid for the whole time elapsing between two subsequent pulses LOAD OUT. During the interval numbered by 0, a code CNT 1÷6 is available which is added to C and is selected by multiplexer 76 and summed to the count already present in register 74 and then loaded onto register 74. During the same interval upon the occurrence of pulse REST, signal ≧20 is generated. This signal causes the selection of code PS1 by multiplexer 76, the control of subtraction by counter 72 and the loading of the previously recorded total deducted of the algebraic value PS1 corresponding to pulse N into register 74.

It is clear that if PS1 is positive (earlier peak-shifts), this value is actually deducted whereas it is summed if PS1 is negative. During the interval labeled 1, when signal ≧20 is still present, multiplexer 76 selects input code ΣDN1 which is deducted from the previous total by counter 72. The result is loaded into register 74 upon receipt of pulse T0. At this point, register 74 contains a code representative of the entity and direction of the actual duration relative to a succession of intervals from which was deducted their nominal duration and was further corrected, in excess or default according to the algebraic value of the last and first pulse peak-shifts of the measurement period. The value of such a difference, referred to N intervals, whose nominal duration is given by ΣDN, is applied as an input to ROM 80 which receives on a pair of inputs, the information ΣDN.

ROM 80 acts as a normalizer, that is, it converts or divides the code at its inputs by the quantity indicated by ΣDN and generates as an output, a percent speed error code ΔV. This code is loaded into register 75 upon receipt of signal LOAD OUT together with signal ≧20. Thereafer, register 73 is reset by pulse T1 ANDed with signal R from flip-flop 81 and signal ≧20 falls to zero. Instead, signal Z0 is generated which ANDed with pulse T2 resets register 74. A new measuring cycle is therefore started.

During the interval labeled 1, code PS1, related to the peak-shift of pulse numbered by 0, is loaded into register 74 at pulse T3. In response to pulse T0, code CNT 1÷6+C defining the measured duration of interval 1, is summed to PS1 and loaded into register 74. In response to signal REST, code DN representative of the nominal duration of interval 1, is loaded into register 73. During the subsequent intervals, the actual (CNT1÷6+C) and the nominal durations (DN) of the subsequent intervals are summed in registers 74 and 73 respectively, until the nominal duration present in register 73 is equal or higher than the value of 20 intervals of 2 microseconds each.

With respect to the speed error measuring process, where the error is the difference between the sums of the actual and nominal durations, the following considerations have to be made. The actual measurement of each interval is carried out with a resolution of 125 microseconds and therefore with uncertainty of ±125 microseconds. However, since the measured period is given by subsequent intervals, that uncertainty of the intermediate intervals is compensated and the actual measurement of the period is affected by uncertainty and a possible error of ±125 microseconds. As the chosen nominal duration of the measured period is a value ranging between 40 and 46 microseconds, the uncertainty or measuring error does not exceed 3%. The peak-shift value, used to correct the measured period is a value resulting from information corrected as to speed error.

Conceptually, for an exact correction, these values should be adjusted according to the speed error, that is, they should be increased or reduced according to the speed error. However, bearing in mind that the time entity of the single peak-shift does not exceed 25% of the nominal duration of the shorter interval, that is, it is within ±1 microsecond; and bearing in mind also that the speed error does not exceed ±10%, the error caused by this approximation does not exceed ±200 microseconds, that is, in most cases, it does not exceed 5%. The speed error is therefore measured with a maximum error not exceeding 0.8%. The value field that register 74 must represent, assuming a maximum speed error of ±10%, a maximum peak-shift of 1 microsecond and a maximum duration of the measured period of 46 microseconds, is equal to ±(4.6+2)= +6.6 microseconds. This field can be expressed with a resolution of 125 microseconds by six bits and one sign bit code. The information from register 74 therefore can be represented by a 7-bit code, one bit of which (the sign bit) bypasses normalizer 80 when loaded into register 75. The least meaningful bit of the code from register 74 can be ignored causing in the error measurement, a default approximation of 25 microseconds, therefore lower than 3%.

It is therefore clear that normalizer 80 can be constructed from a 5+2 input ROM, with 128 addressable locations and an output code ΔV, covering ±10% range, represented by a sign bit and four entity bits, with a resolution equal to approximately 0.6%. While apparently complicated, unit 70 can be easily integrated on a single semiconductor chip together with the other units 20, 30, 40, 50 and 60.

As disclosed, unit 70 defines the speed error by measurements of subsequent periods having a duration ranging from 40 to 46 microseconds and therefore with a frequency exceeding 20 KHz. Hence, it is clear that it can detect with a fair precision and negligible delay, speed variations with a frequency in the order of 1 KHz.

FIG. 5 shows in circuit form, a preferred embodiment of speed error correction unit 40 which minimizes the size of the ROM designed for this operation. The embodiment is based on the following concepts. Code CNT 1÷6 is representative of the measured duration of an interval from which is deducted 2500 microseconds. The required correction is logically made by the addition of 2500 microseconds to the code and by the present correction of the total according to the speed error. Code CNT 1÷6 may be considered as consisting of two elements: a most meaningful portion, measuring the interval in an approximate way and a less meaningful additional portion, measuring the interval more precisely. It is therefore possible to carry out the percent correction of the two parts separately and then to sum up the results. Furthermore, since the correction modifies the measured duration of a quantity no greater than ±10%, the omission of such correction for the less meaningful bit or bits causes negligible errors. As the least meaningful bit is representative of a duration of 125 nanoseconds, the omission of the correction causes an error of ±12.5 nanoseconds to occur which is completely negligible if compared with the measured uncertainty of ±125 nanoseconds. In the same way, if no correction is made to the next more significant bit, this will cause a maximum error of ±25 microseconds to occur which is still a negligible error.

A further concept is that the correction performed by a 5-bit error code DN is executed with a resolution of approximately 0.6%. Therefore, the correction is executed with a rounded off 4-bit code, hence, which a resolution of about 1.2% on the least significant bits of code CNT 1÷6 causes negligible errors to occur. Specifically, a correction is made to the bits of binary positions 1 (250 nanoseconds), 2 (500 nanoseconds) and 3 (1000 nanoseconds) with resolution of 1.2% instead of 0.6% causes a possible error of 1.5 nanoseconds, 3 nanoseconds and 6 nanoseconds, respectively, whose sum is 105 nanoseconds which is negligible as compared to the duration of the measured intervals (from 4 to 8 microseconds nominally).

As shown in FIG. 4, unit 40 therefore includes a first seven input ROM 41, a second seven input ROM 42 and a three input adder 43. The least significant bit CNT 1 of code CNT 1÷6 is directly applied to a first input of adder 43. Bits CNT 2÷4 are applied to the ROM 41 inputs together with bits ΔV2÷4 and sign bit of code ΔV. Bits CNT 5÷6 are applied to the ROM 42 inputs together with the whole code ΔV. ROM 41 and 42 outputs are applied to corresponding inputs of adder 43.

ROM 42 executes the speed corrections by transcoding of the most significant portion of code CNT 1-6 and the "implicit" quantity of 2500 nanoseconds while ROM 42 executes the speed correction with rounding off the speed error on the less meaningful portion excluding the least significant bit. The quantities from the ROMs are the summed up to generate a correct duration code SR 1÷6. It is clear that information output from the ROMs can be represented by codes having a number of bits higher than 6, for instance 8, in order to cause negligible rounding off in counter 43 and then only the most meaningful portion of output code SR can be used.

The described operations of speed error measurement and correction executed by units 70 and 40 are independent of the type of recording. It is therefore clear that without wasting resolution, but on the contrary with an improvement in it, these operations can be executed by ROMs having a total capacity in the order of 463 addressable locations. This is much less than 4K bytes which are required by the mentioned patent application. The need for summing networks, registers and additional logical elements is largely compensated by this important reduction in the required memory capacity.

Figure 6:
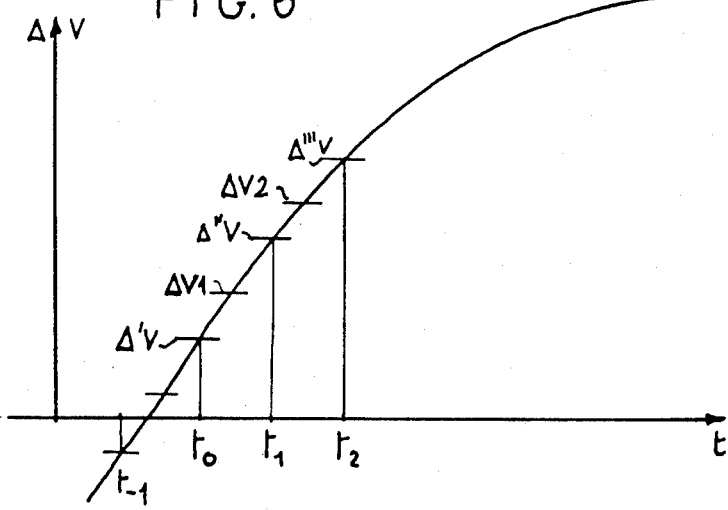
FIG. 6 shows an example of the relationship between measured speed error and actual instantaneous error.

The digital apparatus of the present invention can be further refined. That is, it can define an extrapolated speed error closer to the error condition occurring in the period when the speed error code is used for executing the correction. From the above, it is in fact clear that the speed error is measured over a period of N intervals, whose duration ranges from 40 to 46 microseconds, and then used over a subsequent period of similar duration. Under condition of speed variability at a frequency lower than 1 KHz or with amplitudes in the order of few percent, only negligible speed changes occur from one measurement period to the next one. They become important in presence of frequency of about 1 KHz and amplitude in the order of ±10%. FIG. 6 shows this problem.

FIG. 6 shows the quarter wave of a sinusoidal speed variation with frequency of 1 KHz and amplitude equal to 10%. If the speed error is measured over a period of 40 microseconds starting from time t0, the speed error measured and loaded into register 75 at time t1 is ΔV1, that is, approximately, the average between error Δ'V at time t1. This error is used to correct the speed of interval t1–t2 where the speed error further increases from value Δ"V to value Δ'''V. It is therefore clear that the speed error is corrected minimally and that a better correction would be obtained using a value DV2 ranging between Δ"V and Δ'''V or, at least, equal to Δ"V.

Figure 7:
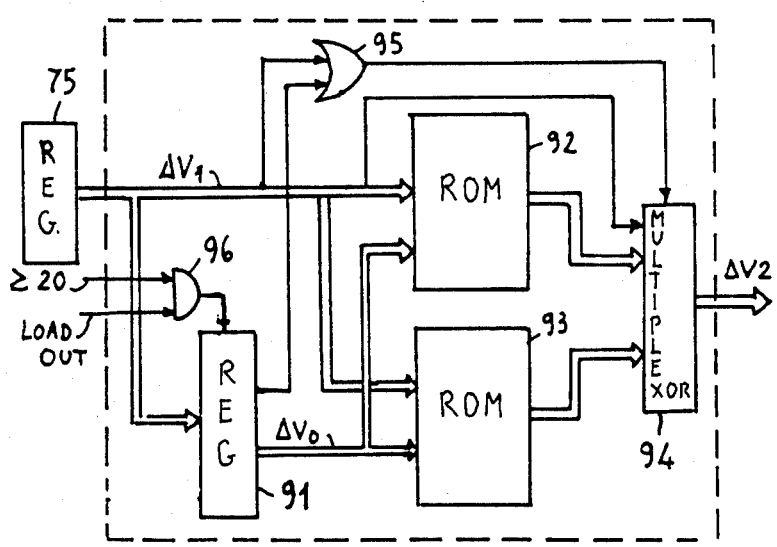
FIG. 7 shows in detail, a preferred embodiment of an extrapolator for the unit shown in FIG. 4.

FIG. 7 shows a logical network 90 which performs this correction and which can be suitably interposed between the output of register 75 of FIG. 4 and the error correction network 90 shown in FIG. 5. Network 90 comprises a register 91, two ROM memories 92 and 93, a multiplexer 94, an OR gate 95 and an AND gate 96. The outputs from register 75 are connected to the inputs to register 91. The loading of register 91 is timed by the rising edge of pulse LOAD OUT when signal ≧20 is applied to the register clock input. In other words, register 91 is loaded synchronously from register 75 so that if register 75 contains a generic speed error ΔV1, register 91 contains speed error ΔV0 measured in the previous period. The most significant bits of codes ΔV0 and ΔV1 are applied as inputs to OR gate 95 whose output is connected to the selection input of multiplexer 94. The outputs from ROM 92 are connected to a first set of inputs of multiplexer 94 and the outputs from ROM 93 are connected to a second set of inputs.

If the most significant bit of at least one of the codes ΔV0 and ΔV1 is a "1", the multiplexer 94 transfers as an output, the code present at the output of the ROM 92 whereas if it is a "0", it transfers the code present at the output of ROM 93. ROM 92 receives as an input, the four amplitude bits of code ΔV1 and the four amplitude bits of code ΔV0 as an output from register 91. The sign bit of code DV1 passes ROM 92 and is directly applied as an input to multiplexer 94.

It is clear that if the speed error is very high (i.e., most significant bit equal to a "1") during two subsequent speed error measured periods, the speed error sign cannot change because the speed fluctuation period is a greater order of magnitude. ROM 92 can therefore perform a linear extrapolation of the only speed error amplitude generating as an output, a code ΔV2 to which the same sign of code ΔV1 is applied. The operation executed by ROM 92 is conceptually as follows:

$$|\Delta V2| = |\Delta V1| + (|\Delta V1| - |\Delta V0|).$$

In practice, to avoid oscillation phenomena in the measuring system, due to the measure uncertainty intrinsic to ΔV1 and ΔV0, it is suitable to limit the extrapolation to a lower value, according to a formula of the following kind:

$$\Delta V2 = \Delta V1 + (|\Delta V1 - I1| - |\Delta V0 + I0|)$$

where I1 and I0 are uncertainty margins assigned to ΔV1 and ΔV0.

ROM 93, instead, receives as an input, three bits of low order binary bits of code ΔV1 and ΔV0 and the related sign and performs on these bits, an extrapolation similar to the previous one bit in algebraic form, generating as an output, and extrapolated error code.

It is therefore clear that the use of two ROMs whose total capacity is equal to 512 addressable locations, permits an extrapolated speed error value DV2 which approximates with considerable precision, the actual value to be obtained. It is obvious that with a little limitation of the correction performed by network 90, for instance, disregarding the less significant bit of code ΔV0, the network can be constructed from ROMs each having 128 locations.

While the above description refers to a preferred embodiment of the invention, it is clear that changes can be made without departing from the scope of the invention. In particular, it is clear that the reference to ROM memories for the execution of transcoding operations includes functionally equivalent devices such as logic matrices and similar devices.

What is claimed is:

1. Digital data separator for use with a unit which records pulses representative of information on movable magnetic media affected by speed error, where the read pulses are affected by peak-shift, said separator including a duration measuring unit for supplying a measure of the actual duration of each of the intervals between two subsequent read pulses, a speed error correction unit for changing said actual duration to a corrected duration, a peak-shift recovery unit for attributing to said corrected duration, an interval nominal duration, for detecting the peak-shift of said interval ending pulse and for generating a nominal duration code and a peak-shift code respectively, and a speed error measuring unit periodically measures the media speed error, said speed error measuring unit comprising:

first addition means for summing a nominal duration code of a plurality of subsequent intervals until the total duration of said intervals is equal or greater than a preestablished duration, said first addition means supplying a first code representative of said total duration;

second algebraic addition means having a plurality of inputs coupled to said duration measuring unit for receiving said actual duration of each of the intervals, to said peak-shift recovery unit for receiving said peak-shift code and to said first addition means for receiving said first total duration code by computing the difference between the sum of the actual duration of said plurality of subsequent intervals and their nominal durations, said second algebraic addition means correcting said difference in excess or deduction by summing and subtracting said peak-shift code of the starting pulse of the first of said subsequent intervals and said peak-shift code of the ending pulse of the last of said subsequent intervals, said second addition means supplying a second code representative of said corrected difference; and, normalization means having inputs coupled to said first and second addition means for receiving said first and said second codes, said normalization means supplying a speed error code from said first and second codes.

2. The digital data separator of claim 1 wherein said speed error unit comprises a first transcoder, a second transcoder and an adder, said first transcoder being coupled to said measuring unit for receiving the least significant bits of a code representative of an interval actual duration and being coupled to said normalization means for receiving the most significant bits of said speed error code, said first transcoder supplying a first corrected duration code, said second transcoder coupled to said measuring unit for receiving the most significant bits of said code representative of an interval actual duration and coupled to said normalization means for receiving said speed error code, said second transcoder supplying a second corrected duration code and said adder coupled to said first and second transcoders for summing said first and second corrected duration codes and supplying a code representative of speed corrected interval duration.

3. The digital data separator of claim 1 wherein said speed error measuring unit further comprises speed error extrapolation means including register means for recording a first speed error code measured during a first period of subsequent intervals and a transcoder coupled to said register means for receiving said first speed error code and a second speed error code measured during a second period of subsequent intervals, subsequent to said first period, said transcoder supplying a speed error code related to a third period of subsequent intervals subsequent to said second period in response to said first and second speed error codes.

* * * * *